United States Patent [19]

Tice

[11] Patent Number: 5,357,243

[45] Date of Patent: Oct. 18, 1994

[54] ELECTRICAL UNIT WITH AN ADJUSTABLE MECHANICAL SWITCH FOR ADDRESS VERIFICATION

[75] Inventor: Lee D. Tice, Bartlett, Ill.

[73] Assignee: Pittway Corporation, Chicago, Ill.

[21] Appl. No.: 961,496

[22] Filed: Oct. 15, 1992

[51] Int. Cl.⁵ .................. H04Q 01/04; E05B 63/00; G08B 29/18

[52] U.S. Cl. .................. 340/825.07; 340/825.520; 403/4; 403/13; 439/134; 70/158

[58] Field of Search ............... 340/825.07, 825.36, 340/825.52; 439/122, 134, 146, 680, 681; 403/3, 4, 13, 14; 70/158, 161, 461, 466, DIG. 32; 292/DIG. 60; 200/11 R

[56] References Cited

U.S. PATENT DOCUMENTS

| | | |
|---|---|---|
| 4,257,039 | 3/1981 | Webb et al. |
| 4,369,435 | 1/1983 | Adachi et al. ............... 340/506 |
| 4,394,655 | 7/1983 | Wynne et al. .............. 340/825.36 |
| 4,489,312 | 12/1984 | Yoshizaki .................. 340/514 |
| 4,823,118 | 4/1989 | Suzuki et al. ............. 340/825.54 |
| 4,829,283 | 5/1989 | Spang et al. ............... 340/524 |
| 4,988,977 | 1/1991 | Payne et al. ............... 340/524 |
| 5,072,216 | 12/1991 | Grange .................. 340/825.52 |
| 5,117,219 | 5/1992 | Tice et al. ................ 340/518 |

FOREIGN PATENT DOCUMENTS

362985 11/1990 European Pat. Off. ..... G08B 17/00

*Primary Examiner*—Donald J. Yusko
*Assistant Examiner*—Greg V. Miller
*Attorney, Agent, or Firm*—Dressler, Goldsmith, Shore & Milnamow, Ltd.

[57] ABSTRACT

There is disclosed an addressable device for receiving address coded signals from a central control unit. The device includes an electrical unit that is detachably connected to a base. The electrical unit has a switch for setting the address of the electrical unit. The base has an addressable key that is insertable into an opening in said switch when the addresses of the key and switch match and is not insertable when the addresses do not match. Alternatively, there is an addressable lock on one of the electrical unit and base and a separate addressable key on the other of the electrical unit and base.

37 Claims, 5 Drawing Sheets

ELECTRICAL UNIT WITH AN ADJUSTABLE MECHANICAL SWITCH FOR ADDRESS VERIFICATION

FIELD OF THE INVENTION

This invention relates generally to addressable electrical units, and more particularly, to an addressable electrical unit for receiving address coded signals from a central control unit.

BACKGROUND OF THE INVENTION

Addressable electrical units for receiving address coded signals have a variety of uses relating to smoke, fire and burglar detector systems. In each such system, there is a central control which transmits address coded electronic signals to remote sensors or electrical units, each unit having its own address. Thus, the central control can communicate selectively with each remote unit for a variety of purposes including testing of the units, locating the address of a sensor that has been triggered, detecting removal of a unit, etc.

Such systems for use with fire detectors and smoke detectors are described in U.S. Pat. Nos. 5,117,219 (Tice) and 4,829,283 (Spang), which are incorporated by reference herein.

There are several known methods for setting the address of a remote electrical unit which receives address coded signals. One known method is to place an addressable receiver for receiving address coded signals in a mounting base which holds a detachable sensor unit. The mounting base has a mechanical or electronic means for setting the address of the receiver. Thus, the central control unit correlates the address code with the mounting base. This method has the disadvantage of requiring maintenance of mechanical and electrical components located in the mounting base which may be difficult to access.

A second method includes locating the receiver and its addressable portion in the detachable sensor unit instead of the mounting base. This avoids the problem of having to maintain mechanical and electronic components located in the mounting base.

A disadvantage of such a system is that the addressable detachable unit may be removed from its mounting base and inadvertently placed into a different mounting base at a different location. Thus, the location of the sensor unit is changed while the address in the receiver inside the sensor unit remains unchanged. It would be desirable to prevent this inadvertent misplacement of the unit.

There continues to be a need for a detachable sensor unit having an addressable receiver and a mounting base having a means for verifying the address of the detachable unit to prevent misplacement of the unit.

SUMMARY OF THE INVENTION

The addressable electrical unit of this invention provides a system wherein an addressable electrical unit, such as a sensor unit, is connected to a separately addressable mounting base. When the addresses of the electrical unit and mounting base match, then the electrical unit and mounting base can be fitted together and connected. When the addresses do not match, then the electrical unit and mounting base cannot be fitted and connected. Thus, the mounting base verifies the address of the electrical unit and inadvertent misplacement of the electrical unit is avoided.

The present invention is directed to an addressable device having a base and an electrical unit for receiving address coded signals from a central control unit. The base and electrical unit are releasably couplable together with a mechanical latch to form the device.

The electrical unit has a receiver for receiving address coded signals from the central control unit. The electrical unit has an adjustable mechanical switch for setting an address therefor. The base has a settable key for interacting with the mechanical switch of the electrical unit. The key couples with the mechanical switch and permits the fitting together of the base and electrical unit only in response to a match of addresses therebetween. The key and switch prevent the fitting together in the absence of a match of addresses.

In accordance with a preferred embodiment, the mechanical switch is rotatable. In an alternative embodiment, the key is also adjustable to a plurality of addresses.

In an alternative embodiment of the present invention, the device has a sensor for receiving address coded signals and a support to which the sensor is detachably connectable for holding the sensor at a fixed location. The sensor has an address switch for setting the sensor to receive an address coded signal.

A lock is connected to one of the sensor and the support, and a key means is connected to other of the sensor and support. The lock and key have separate address switches for permitting the sensor to be connected to the support when the addresses are matching and preventing a connection when the addresses are not matching. In a preferred embodiment, at least one of the lock and key are adjustable to a plurality of addresses.

In accordance with a preferred embodiment of the invention, the base and electrical unit are rotatable relative to each other through a relatively small angle when fitted together between an installed position and a non-installed position. The key in the base is movable relative to the base between an installed position and a non-installed position. A switch is located in the electrical unit. When the key is inserted into the switch, the key moves with the switch as the electrical unit is rotated relative to the base.

In a preferred embodiment, the movable key is mounted on a movable slide member. A detent is provided for biasing the movable key toward the non-installed position.

The present invention provides for a method for connecting a base and electrical unit that receives address coded signals from a central control unit. The method includes the steps of providing a lock having an address that is located on either the base or the electrical unit, and providing a key having an address that is located on the other of the base or the electrical unit. The lock and key permit the connection of the base and the electrical unit when their addresses are matching and prevent the connection when their addresses are not matching.

BRIEF DESCRIPTION OF THE DRAWINGS

A more complete appreciation of this invention, and many of the attendant advantages thereof will be readily apparent as the same becomes better understood by reference to the following detailed description, when considered in conjunction with the accompanying drawings, in which like reference numerals indicate the same or similar components, wherein.

DETAILED DESCRIPTION OF THE INVENTION

The following is a detailed description of the invention. The detailed description is not intended to be an exhaustive description of all embodiments within the scope of the invention and is not intended to limit the scope of the claims to the disclosed embodiments. Other embodiments within the scope of the claims will be apparent to those skilled in the art.

Figure 1:
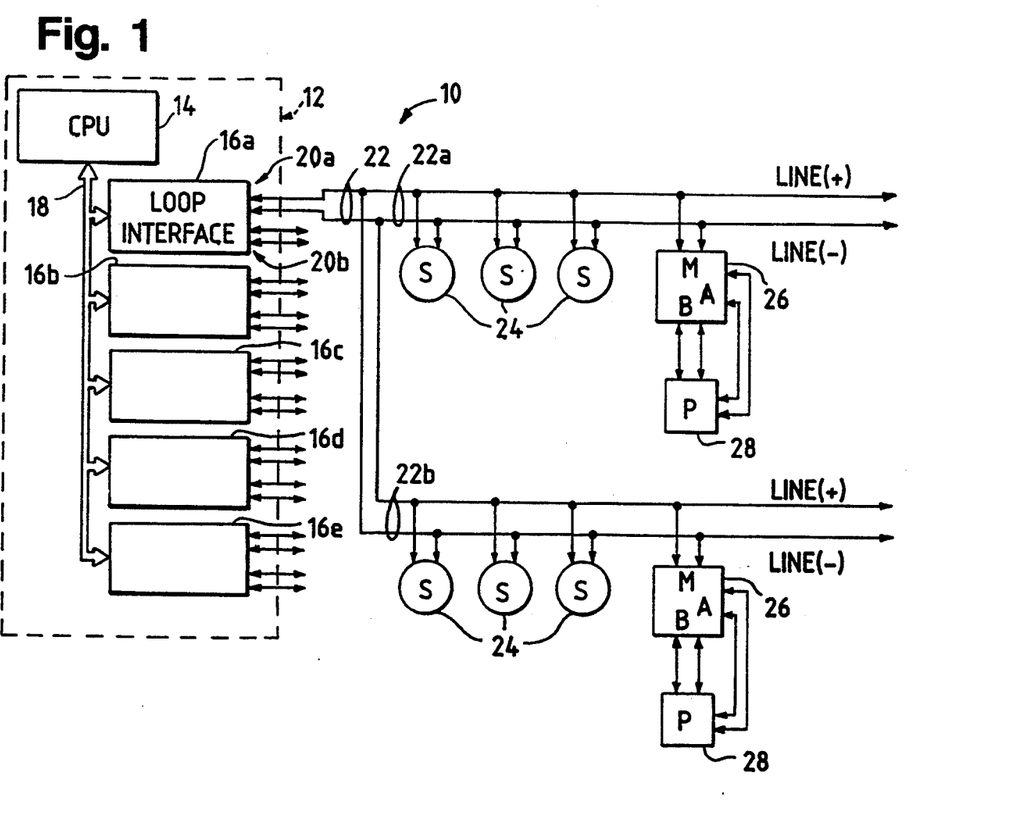
FIG. 1 is a block diagram of a smoke/fire detection and alarm system.

Referring to FIG. 1, a detection and alarm system 10 includes a central control unit 12, which includes a central processing unit (CPU) 14 and a number, here five, of loop interface sections 16a–16e connected to CPU 14 via a two-way data bus 18. The detection and alarm system may function to detect smoke, fire, intruders, etc. Loop interface sections 16a–16e each have two sets of input/output ports 20a, 20b, each connected to a standard two-wire communication line, e.g., line 22 connected to input/output port 20a of loop interface section 16a.

Communication line 22 has two parallel branches, 22a, 22b (a greater or fewer number of branches may be used). Six devices 24 for receiving address-coded signals from the central control unit 12 are connected to communication line branches 22a, 22b, as are a pair of module transponders 26. Each device 24 contains a sensor for sensing smoke, fire, intruders, etc. Module transponders 26 are further connected to peripheral devices 28, such as sounders, strobes, door closers, or water flow switches.

The central control unit 12 sends address coded signals that are addressed to the devices 24. Each of the devices 24 in the system 10 is addressable, i.e. it has a separate address for receiving address coded signals corresponding to its address. Thus the central control unit 12 communicates selectively with the various devices 24 in the system 10.

Figure 2:
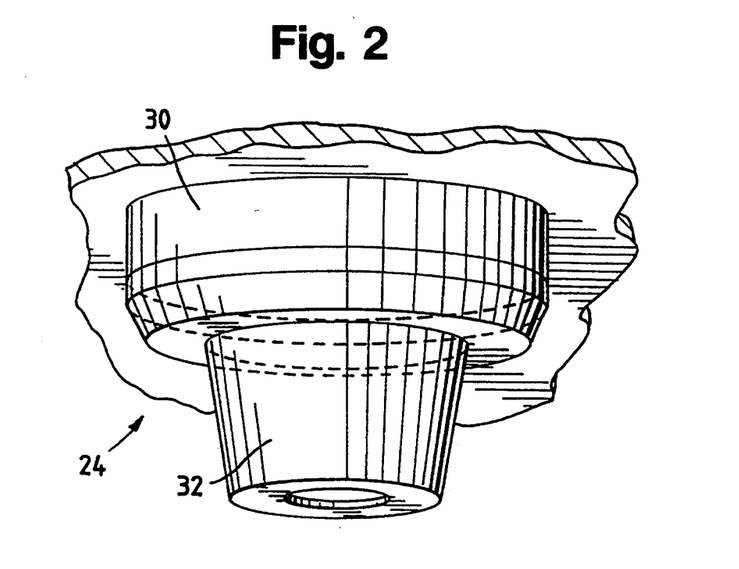
FIG. 2 is a perspective view of an addressable device in accordance with the invention wherein the base and the electrical unit are connected together and attached to a flat surface.

Referring to FIG. 2, the device 24 includes a support means or base 30 that is affixed to a structure at a given location and a sensor means or electrical unit 32 that is detachably connected to the base. The base 30 and electrical unit 32 are releasably coupled together with a mechanical latch.

Preferably, the electrical unit 32 is fitted into the base 30 and rotated through a relatively small angle into an installed or latched position as is well known in the art. Preferably the base 30 and electrical unit 32 are constructed from a conventionally-molded hard plastic.

The electrical unit 32 (FIG. 2) has an addressable receiver (not shown). The addressable receiver of the unit 32 selectively receives signals that are coded for its particular address. The receiver may have an address setting switch wherein the receiver's address can be adjusted to receive address coded signals directed to a variety of addresses. The methods and apparatuses for making and using addressable electrical units are well-known in the art and need not be discussed further.

Figure 3:
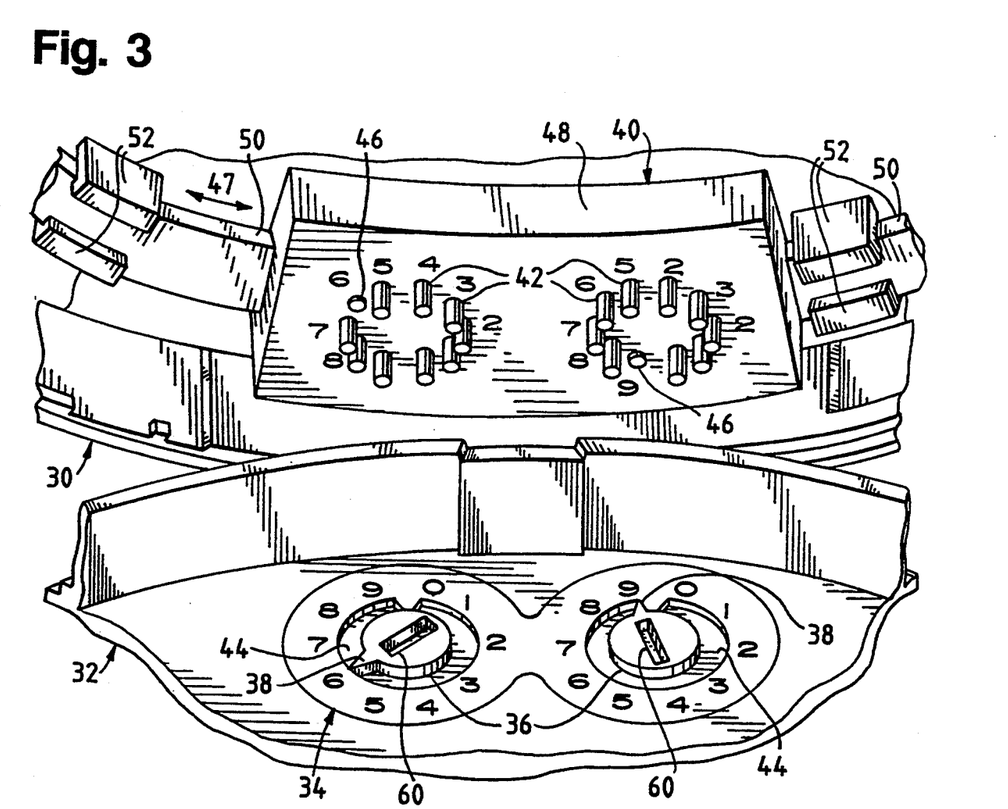
FIG. 3 is a partial view of an addressable device in accordance with the invention wherein the base and electrical unit have been disconnected from each other.

Referring to FIG. 3, the electrical unit 32 preferably has a mechanical switch 34 for adjusting the address of the receiver. The switch 34 includes two dials 36 with protruberances or arrows 38 that point to numerals 0–9 surrounding each dial. Thus, the switch 34 enables the address to be adjusted to any two-digit address from 00 to 99. In FIG. 3, the arrows 38 on the dials 36 point to 6 and 9 and therefore the address of the switch is 69. Preferably, the dials are conventionally molded of hard plastic.

There is a key 40 on the base 30 in juxtaposed relationship to the switch 34 (FIG. 3). The key 40 includes a plurality of numbered posts 42 arranged in a generally circular arrangement to form an upstanding circular wall. The posts 42 are oriented opposite a circular groove 44 that surrounds each dial 36 in the switch 34. Preferably, the posts are conventionally molded of hard plastic.

Each of the two circles of posts 42 (FIG. 3) has one missing post or opening 46 to indicate a digit for the address of the key 40. Preferably, the posts 42 are detachable to permit setting the address. Alternatively, the posts 42 can be cut off or broken off of the key 40. Thus, the key 40 has an address capability wherein the address for the key can be set from 00 to 99. In FIG. 3, the missing posts 46 are numbered 6 and 9 and therefore the address of the key is 69.

When the addresses of the switch 34 and key 40 match, the protruding arrow 38 in each dial 36 fits into the respective opening 46 created by the missing post in each circle of posts 42 when the posts 42 are fitted into the groove 44. Thus, the matching addresses permit the engagement of the switch 34 and key 40 and thereby permit the coupling of the electrical unit 32 and base 30.

If the addresses of the switch 34 and key 40 do not match, then the arrows 38 in the switch 34 will not be oriented to fit in the openings 46 created by the missing posts. Instead, the arrows 38 will contact upstanding posts 42 and block the posts from fitting into the groove 44. Thus, unmatched addresses prevent engagement of the switch 34 and key 40 and thereby prevent the coupling of electrical unit 32 and base 30.

The key 40 is movable relative to the base 30 between an installed position and a non-installed position as indicated by the arrow 47 in FIG. 3. The movement of the key 40 is preferably accomplished by mounting the key 40 on a movable mount shown as a slide member 48 having arms 50 that slide under retainers 52. The retainers 52 extend sufficiently over the arms 50 to retain the slide member 48, yet preferably deflect sufficiently to permit the arms 50 to snap in and out. Thus, the slide member 48 is detachable. Preferably, the slide member 48 is conventionally molded of hard plastic and the retainers 52 are molded into the hard plastic base 30.

When the base 30 and electrical unit 32 are fitted together and moved through a relatively small angle between an installed position and a non-installed position, the key 40 on the base 30 will move with the switch 34 on the electrical unit 32 (FIG. 3).

Figure 4:
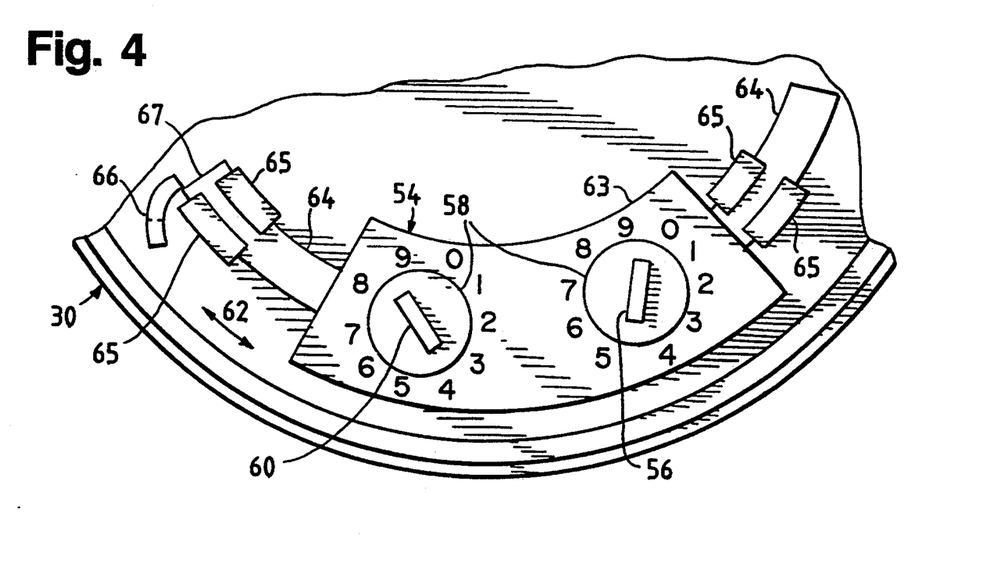
FIG. 4 is a partial view of the base of an alternative embodiment of an addressable device in accordance with the invention.

Referring to FIG. 4, an alternative embodiment of the invention includes a key 54 on the base 30 having two protruberances 56 which extend upwardly from the key 54. The two protruberances 56 have a rectangular cross-section and are oriented relative to numerals 0 through 9. Thus, the key 54 has an address means wherein the key can be set at any address between 00 and 99. Preferably, the protruberances 56 are on dials 58 which can be rotated in order to adjust the address.

The protruberances 56 on the key 54 (FIG. 4) are configured to fit within keyholes shown as rectangular slots 60 in the switch 34 (FIG. 3) when they are oriented in the same direction (which occurs when the key 54 is set to the same address as the switch 34). When the protruberances 56 fit into the slots 60, the key 54 and switch 34 may be coupled together thus permitting the coupling of the base 30 and electrical unit 32. When the protruberances 56 are not oriented to fit in the slots 60 (which occurs when the addresses are not matching), then the protruberances 56 and slots 60 interfere with the coupling of the key 54 and switch 34 and thereby interfere with the coupling of the base 30 and electrical unit 32.

The key 54 (FIG. 4) is movable relative to the base 30 as indicated by the arrow 62. The key 54 is mounted on a slide member 63 having arms 64 that slide under retainers 65.

A detent 66 extends over an end 67 of an arm 64 so as to bias the slide member 63 toward a non-installed position. In its non-installed position, the key 54 is aligned with the switch 34 (FIG. 3) when the electrical unit 32 and base 30 are brought together for installation. Preferably, the detent 66 is molded into the hard plastic base 30.

Figure 5:
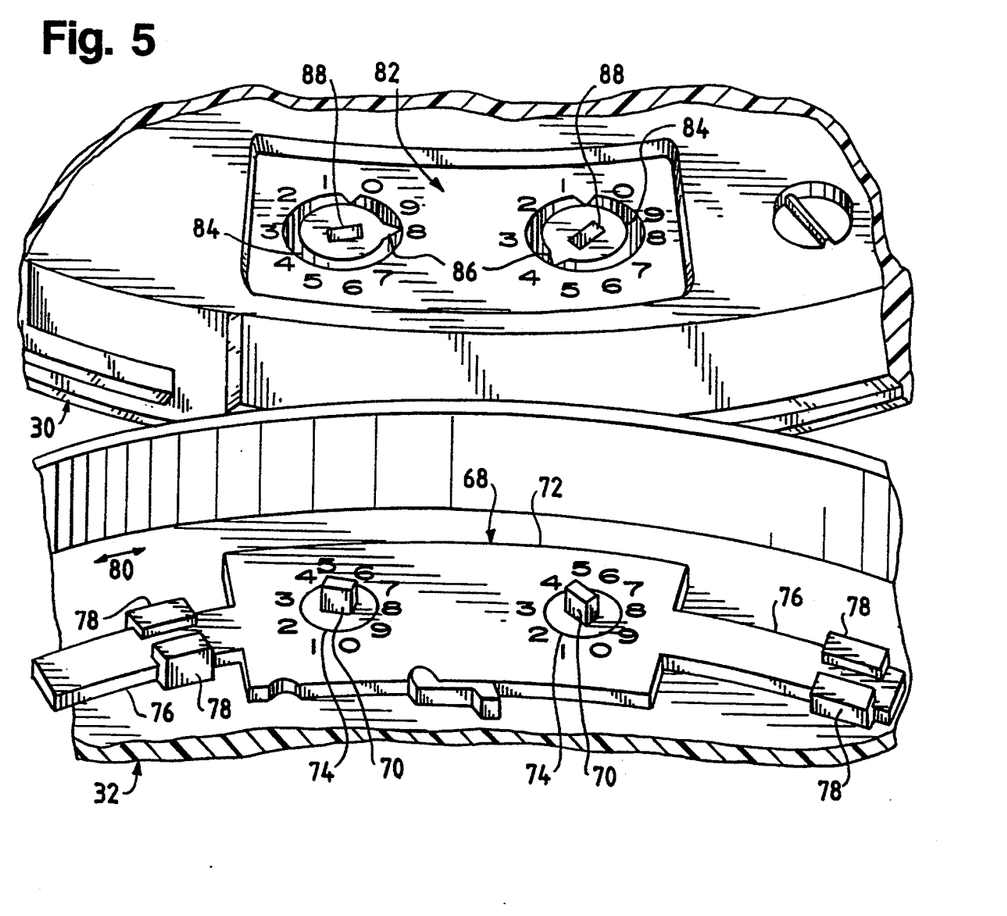
FIG. 5 is a partial view of the base and electrical unit of a third embodiment of an addressable device in accordance with the invention wherein the base and electrical unit have been disconnected from each other.
Figure 6:
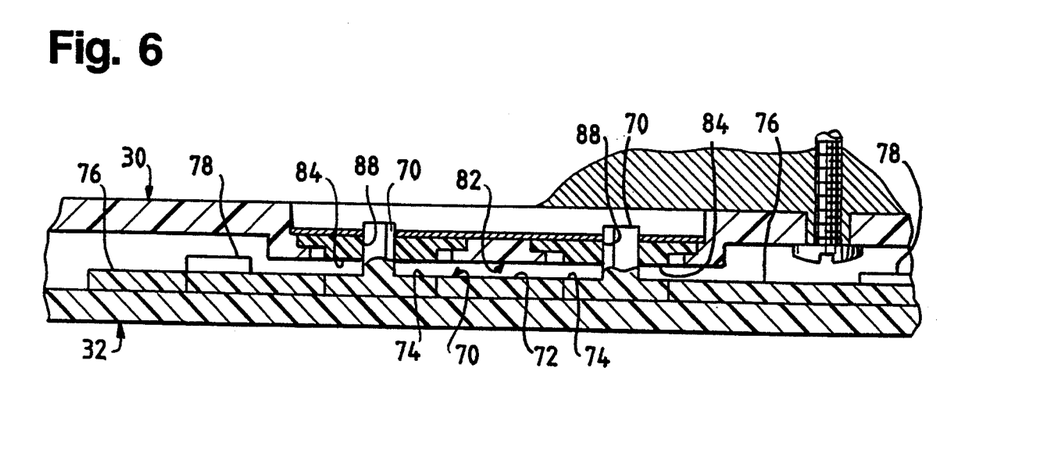
FIG. 6 is a partial cross-sectional view of the addressable device shown in FIG. 5 wherein the base and electrical unit are connected together.

Referring to FIGS. 5 and 6, an alternative embodiment of the invention includes a key or verification element 68 on the sensor or electrical unit 32 instead of the base 30. The key 68 includes two rectangular protruberances 70 extending from a slide member 72. The two protruberances 70 are oriented relative to numerals 0 through 9. Thus, key 68 has an address means wherein it is assigned an address. Preferably, the two protruberances 70 are on rotatable discs 74 which permit adjustment of the address of the key between 00 and 99.

Arms 76 (FIGS. 5 and 6) extend from each side of the slide member 72 and fit under retainers 78 in the electrical unit 32. Thus, the key 68 slides in the direction of the arrow 80 (FIG. 5) between an installed position and a non-installed position.

On the supporting member or base 30 (FIGS. 5 and 6), a lock 82 is in juxtaposed relationship to the key 68. The lock 82 includes two dials 84 with arrows 86 that point to numerals surrounding each dial. Thus, the lock 82 has an address setting means wherein the address of the lock 82 can be adjusted and set to any address between 00 and 99.

Each dial 84 (FIGS. 5 and 6) has a keyhole shown as a rectangular slot 88 which is configured to receive a rectangular protruberance 70 of the key 68 when the base 30 and electrical unit 32 are brought together. When the slots 88 are aligned with and receive the protruberances 70 in the key 68, then the lock 82 and key 68 are coupled together, thus permitting the base 30 and electrical unit 32 to be coupled together (as shown in FIG. 6).

As depicted in FIGS. 5 and 6, the key 68 is on the sensor means or electrical unit 32 and the lock 82 is on the support means or base 30. However, the positions of the key 68 and lock 82 may be reversed wherein the key 68 is on the support means or base 30 and the lock 82 is on the sensor means or unit 32 (this embodiment not illustrated).

Figure 7:
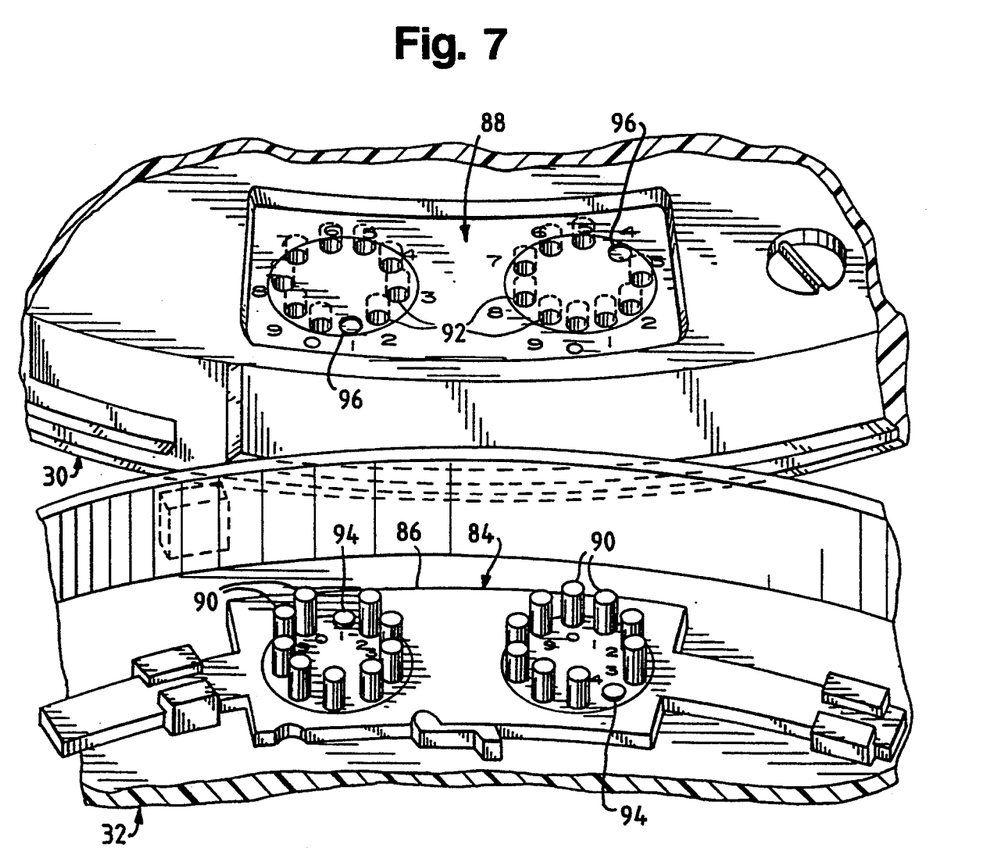
FIG. 7 is a partial view of a fourth embodiment of an addressable device in accordance with the invention wherein the base and electrical unit have been disconnected from each other.

Referring to FIG. 7, another alternative embodiment of the invention includes a key 84 on the sensor means or electrical unit 32 and a lock element 88 located on the support or base 30. The key 84 has two sets of numbered posts 90 arranged in a generally circular arrangement on a slide member 86. The two circles of posts 90 are configured to be fitted into two circles of numbered holes 92 on the lock element 88.

There is a missing post or space 94 in each circle of posts 90 on the key 84 (FIG. 7). There is a corresponding omitted hole 96 in each circle of holes 92 in the lock element 88. Each of the missing posts 94 and omitted holes 96 corresponds to a number between 0 and 9. Thus, the key and lock element have address setting means wherein they have an address between 00 and 99.

The circle of posts 90 and/or the circle of holes 92 may be mounted on a rotary dial (not illustrated) to permit adjustment of their addresses.

Figure 8:
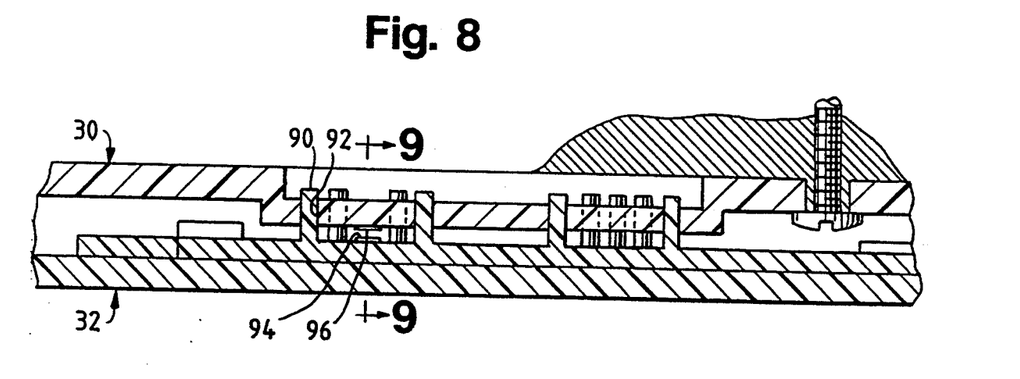
FIG. 8 is a partial cross-sectional view of the addressable device shown in FIG. 7 wherein the base and electrical unit are connected together.
Figure 9:
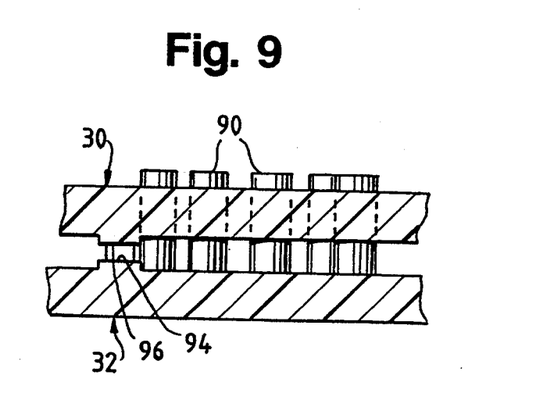
FIG. 9 is a cross-sectional view taken along the line 9—9 in FIG. 8.

When the addresses of the lock element 88 and key 84 are matching, then the posts 90 are aligned with and inserted into the holes 92 in order to permit coupling of the electrical unit 32 and base 30 as shown in FIGS. 8 and 9. When so aligned and coupled, the missing posts 94 are opposite the omitted holes 96. When the posts 90 and holes 92 are not aligned, then the posts 90 cannot be inserted into the holes 92 and the unit 32 cannot be coupled to the base 30.

As seen from the above description, the apparatus of this invention is useable in a novel method for verifying that an appropriate electrical unit is coupled to a base. The method includes the steps of a) providing an addressable lock on either the base or the electrical unit, and b) providing an addressable key on the other of the base or the electrical unit. The lock and key are individually settable as discussed above. The lock and key permit the coupling of the electrical unit to the base only when their addresses are matched and prevent coupling when their addresses are not matched.

When the base and electrical unit are rotatable relative to each other between a latched position and a non-latched position, then the method of the invention includes a further step of providing a sliding mount on either the base or the electrical unit for slidable attachment of either the lock or the key.

The method in accordance with the invention can be used in a variety of applications, including smoke, fire and burglar detection systems wherein the electrical unit is a smoke, fire or intrusion sensor that receives address coded signals from a central control unit.

What Is claimed:

1. An addressable device for receiving address coded signals from a central control, said device comprising:

a base and an electrical unit, said base and said unit being releasably couplable together to form the device and having a mechanical latch for latching said base and said unit together, said unit having a receiver for receiving address coded signals from said central control, said unit having an adjustable mechanical switch for setting an address therefor, said base having a key for fitting into said mechanical switch, said key having an address wherein said key couples with said switch and permits said fitting together of said base and said unit in response to a match of addresses therebetween, said key and switch preventing said fitting together in the absence of said match.

2. An addressable device in accordance with claim 1 wherein said key is adjustable to a plurality of addresses.

3. An addressable device in accordance with claim 2 wherein said switch includes at least one rotatable element and said key includes at least one rotatable key element for fitting into said rotatable switch element.

4. An addressable device in accordance with claim 1 wherein said switch defines a keyhole and said key includes at least one protruberance for fitting into said keyhole.

5. An addressable device in accordance with claim 1 wherein one of said switch or said key includes at least one protuberance and the other of said switch or said key defines at least one opening for matching said protuberance.

6. An addressable device in accordance with claim 5 wherein at least two upstanding posts are adjacent to said opening.

7. An addressable device in accordance with claim 1 wherein said switch includes at least one protuberance and said key includes an upstanding wall defining an opening wherein said protuberance fits into said opening.

8. An addressable device in accordance with claim 7 wherein said wall includes a plurality of posts.

9. An addressable device in accordance with claim 1 wherein said base and unit are rotatable relative to each other through a relatively small angle when fitted together between an installed position and a non-installed position, said key in said base being movable relative to said base between an installed position and a non-installed position so as to permit said rotation of said base and unit when said key is fitted into said switch.

10. An addressable device in accordance with claim 9 wherein said key includes a detent means for biasing said key toward said non-installed position.

11. An addressable device in accordance with claim 1 wherein said key is detachable from said base.

12. An addressable device in accordance with claim 8 wherein said posts are individually detachable from said switch.

13. An addressable device in accordance with claim 1 wherein said device is a smoke detector.

14. An addressable device in accordance with claim 1 wherein said device is a fire detector.

15. An addressable device in accordance with claim 1 wherein said device is an intrusion detector.

16. An addressable device for receiving address coded signals from a central control, said device comprising:

a sensor means for receiving said address coded signals;

a support means being detachably connectable to said sensor means for holding said sensor means at a fixed location;

an address means within said sensor means for setting said sensor means to receive an address coded signal;

a lock means and a key means for interacting with each other, said lock means being connected to at least one of said sensor means and said support means and said key means being connected to the other of said sensor means and said supporting means, said lock means and said key means having separate address means for permitting said sensor means to be connected to said support means when said lock means and said key means are set to matching addresses and preventing said connection when said addresses are not matching.

17. An addressable device in accordance with claim 16 wherein at least one of said lock means and said key means is adjustable to a plurality of addresses.

18. An addressable device in accordance with claim 16 wherein said lock means and said key means are separately adjustable to a plurality of addresses.

19. An addressable device in accordance with claim 16 wherein said lock means includes a keyhole and said key means includes a matching key for insertion into said keyhole.

20. An addressable device in accordance with claim 16 wherein said key means is adjustable to be matchable to a preset address on said locking means.

21. An addressable device in accordance with claim 16 wherein said locking means is adjustable to be matchable to a preset address on said key means.

22. An addressable device in accordance with claim 16 wherein said support means and said sensor means are rotatable relative to each other between an installed position and a non-installed position, said device having a latch means for connection of said support means and said sensor means when in said installed position, said device having a movable mounting means on one of said support means and said sensor means for mounting of one of said lock means and said key means, said mounting means being movable between an installed position and a non-installed position.

23. An addressable device in accordance with claim 22 wherein said movable mounting means is for mounting of said key means.

24. An addressable device in accordance with claim 22 wherein said movable mounting means includes a detent means for biasing said mounting means toward said non-installed position.

25. An addressable device in accordance with claim 22 wherein said movable mounting means is on said support means.

26. An addressable device in accordance with claim 22 wherein said movable mounting means is on said sensor means.

27. An addressable device in accordance with claim 22 wherein said movable mounting means includes a slide member.

28. An addressable device in accordance with claim 27 wherein said slide member is detachable.

29. An addressable device in accordance with claim 16 wherein said device is a smoke detector.

30. An addressable device in accordance with claim 16 wherein said device is a heat detector.

31. An addressable device in accordance with claim 16 wherein said device is an intrusion detector.

32. An addressable device in accordance with claim 16 wherein said lock means is located on said support means and said key means is located on said sensor means.

33. An addressable device in accordance with claim 16 wherein said lock means is located on said sensor means and said key means is located on said support means.

34. A method for connecting a base and an electrical unit that receives address coded signals from a central control unit, said method comprising the following steps:
   a) providing a lock on one of said base and said electrical unit, said lock having an address; and
   b) providing a key on the other of said base and said electrical unit, said key having an address, said lock and said key permitting connection of said base and said electrical unit when set to matching addresses and preventing said connection when not set to matching addresses.

35. A method in accordance with claim 34 wherein said lock is provided on said electrical unit and said key is provided on said base.

36. A method in accordance with claim 34 wherein said base and said electrical unit are rotatable relative to each other between a latched position and a non-latched position, said method including the following step:
   c) providing a sliding mount on one of said base and said electrical unit for slidable attachment of one of said lock and said key.

37. A method in accordance with claim 36 wherein said sliding mount is provided on said base.

* * * * *